United States Patent [19]

Baron et al.

[11] 3,726,654

[45] Apr. 10, 1973

[54] PROCESS FOR GASIFYING HEAVY HYDROCARBONS

[75] Inventors: Gerhard Baron, Hofheim; Horst Bechthold, Frankfurt am Main; Helmut Liebgott, Bad Homberg, all of Germany

[73] Assignee: Metallgesellschaft AG, Frankfurt am Main, Germany

[22] Filed: Mar. 1, 1971

[21] Appl. No.: 119,915

[30] Foreign Application Priority Data

Mar. 17, 1970 Germany.....................P 20 12 529.5

[52] U.S. Cl. .....................48/215, 252/373, 252/468
[51] Int. Cl. ...............................................C01b 2/14
[58] Field of Search.....................48/214, 215, 197; 252/468, 467, 373

[56] References Cited

UNITED STATES PATENTS

| | | | |
|---|---|---|---|
| 2,673,794 | 3/1954 | Williams | 48/214 |
| 2,976,134 | 3/1961 | Paull | 48/214 X |
| 3,506,418 | 4/1970 | Billings | 48/214 |

*Primary Examiner*—Joseph Scovronek
*Assistant Examiner*—R. E. Serwin
*Attorney*—Burgess, Dinklage & Sprung

[57] ABSTRACT

High-boiling, heavy hydrocarbons are converted into a low-methane gaseous mixture containing hydrogen, carbon monoxide and carbon dioxide, substantially free of carbon black, by first reacting such hydrocarbons with water vapor and oxygen in the absence of a catalyst at elevated temperatures and thereafter contacting the resulting reaction mixture with a chromium oxide containing catalyst.

7 Claims, No Drawings

PROCESS FOR GASIFYING HEAVY HYDROCARBONS

BACKGROUND

This invention relates to a process for converting heavy hydrocarbons into a substantially carbon black free, low methane gaseous mixture containing hydrogen, carbon monoxide and carbon dioxide as the major constituents.

It is known to react gaseous or liquid light hydrocarbons with water vapor in contact with indirectly heated, nickel-containing catalysts at temperatures of 700°–850° C to form a low-methane gas which consists substantially of hydrogen and carbon mono- and di- oxides. Methane, liquefied gas and liquid hydrocarbons of the naphtha range, having a final boiling point up to about 180°–200° C, are suitable as feedstocks for this process, which may be carried out as an autothermic process, without an indirect supply of heat, if sufficient free oxygen is added to the mixed feedstocks consisting of hydrocarbons and water vapor so that the resulting exothermic reaction supplies the heat required for the endothermic reaction between the hydrocarbons and water vapor. The overall reaction may be carried out at temperatures up to 1,000° C.

It is also known to react gaseous or liquid light and heavy hydrocarbons with oxygen and with an addition of water vapor at still higher temperatures, above 1,200° C, in order to induce a thermal oxidation without the assistance of a catalyst. In that process, which has often been described as gasification, even very heavy petroleum fractions, such as residual oils, may be used as feedstocks. Although this high flexibility of that process as regards the nature of the feedstocks is an advantage, the process has the disadvantage that part of the carbon contained in the feedstock hydrocarbons is reacted to form carbon black. Whereas less than 1 percent carbon is converted into carbon black in the gasification of light hydrocarbons, the proportion of carbon black in the product obtained from heavy hydrocarbons, such as heavy fuel oil or residual oil, may rise to more than 3 percent of the feedstock carbon. That carbon black must be virtually entirely removed before the gas product can be used. To remove the carbon black, the gas is in most cases scrubbed with water and the carbon black is separated from the resulting mixture of water and carbon black. Part of this separated carbon black may be admixed to the heavy oil used as a feedstock for the gasification. In most cases, however, a considerable part of the carbon black must be removed from the processs and be disposed of by other means, such as combustion.

Light liquid hydrocarbons of the naphtha range may be subjected to a two-stage gasification comprising a partial oxidation in the presence of water vapor to produce a gas which is free of carbon black. In that process, the hydrocarbons are cracked in a first reaction zone by a reaction with oxygen and water vapor at temperatures of about 1,000° C and without the assistance of a catalyst to produce a gas which contains carbon black and that gas is further reacted in a second reaction zone in contact with a nickel-containing catalyst. The oxidizing thermal cracking at temperatures of about 1,000° C involves the formation of only a small amount of carbon black, which can be reacted with hydrogen or water vapor in contact with the catalyst at temperatures of about 900° C to form gaseous compounds. At the same time, the thermodynamic equilibrium between the several components of the reaction product is substantially established at the catalyst.

That two-stage process cannot be used with high-boiling and heavy hydrocarbons, such as residual oils or heavy fuel oils, because the known and conventional nickel catalysts do not withstand the high temperatures, above 1,300° C, which are required for the oxidizing thermal cracking. Above 1,200° C, the vapor pressure of nickel becomes so high that the nickel content and with it the activity of the catalyst decrease rapidly.

SUMMARY

It has been found that a low-methane gas which contains substantially $H_2$, $CO$, $CO_2$ and which is substantially free of carbon black can be produced even from high-boiling, heavy hydrocarbons by a gasification with oxygen and water vapor if the feedstocks are first reacted in the absence of a catalyst at high temperatures above about 1,200° C, e.g., about 1,500° C, and thereafter immediately contacting the resulting hot reaction mixture, which contains carbon black, with a catalyst which contains chromium oxide.

DESCRIPTION

The catalyst may consist of chromic oxide in pure form or on a support. A preferred catalyst contains 20–75 mole percent $Cr_2O_3$ in mixture with magnesium oxide. Such catalyst may be made, e.g., in porous magnesium oxide bodies fired at high temperatures that are repeatedly impregnated with the solution of a chromic salt which is decomposed at high temperatures, and the bodies which then contain chromic oxide are dried and fired. Alternatively, magnesium oxide and chromium oxide powders may be mixed and bodies of suitable size may be formed from the mixture by tableting, pelletizing or granulating. For instance, powders of magnesium oxide, which may be prehydrated, if desired, so that it is partly transformed into $Mg(OH)_2$, and chromium oxide can be mixed. The mixture is pelletized with an addition of water and a binder, such as bentonite. In this way, balls of fairly uniform size, which are 10–30 millimeters in diameter, can be made. These pellets are fired at temperatures above 1,400° C and may then be used in the process of the invention. The molar ratio of $MgO$ to $Cr_2O_3$ should be between 4:1 and 1:3, preferably between 1.5:1 and 1:1.5. The ratio of 4:1 represents a minimum of 48 percent by weight of chromic oxide in the catalyst.

The process according to the invention is carried out at pressures of 1–100, preferably 20–80 kilograms per square centimeter above atmospheric pressure, and preferably in a shaft reactor, which has in its upper portion a catalyst free space which is free of internal fixtures and in its lower portion contains the catalyst layer. The hydrocarbon mixture which is to be gasified and which may contain water vapor, on the one hand, and oxygen and the main amount of water vapor, on the other hand, are mixed immediately before or as they enter the top end of the reactor. The thermal cracking reaction at temperatures above 1,200° C is carried out in the empty top zone of the reactor.

A grate above the bottom of the reactor carries the catalyst layer, in which the primary cracked product, which contains carbon black, is further reacted so that the carbon black is completely consumed and converted into gaseous substances. The temperature in the catalyst zone is about 1,200°–1,400° C.

Air or oxygen-enriched air may be used as a gasifying agent instead of pure oxygen. In synthesis gases which contain CO and $H_2$ and from which pure hydrogen can be produced, $N_2$ is an undesired inert gas. A feed gas for the synthesis of ammonia consists of $H_2$ and $N_2$ and should not contain CO and can be produced by the process according to the invention using air or oxygen-air mixtures as an oxidizing gasifying agent. It will depend on the economic considerations of a given case whether an oxidizing gasifying agent which contains $N_2$ or one which is free of $N_2$ is used.

The following control and examples are intended to further illustrate the invention.

CONTROL

A refractory-lined, cylindrical reaction chamber having an inside width of 470 millimeters and a height of 3,500 millimeters is supplied from above with 400 kilograms heavy fuel oil ($d_{15}$ = 0.96, viscosity 59° Engler, net caloric or heating value 9,500 kilocalories per kilogram), 250 kilograms steam and 300 standard cubic meters of oxygen per hour for a reaction under a pressure of 30 kilograms per square centimeter above atmospheric pressure so that a temperature of 1,450° C results in the main reaction zone. The gas discharged at the bottom of the empty reactor chamber is scrubbed with water to remove the carbon black; 8 kilograms of carbon black are obtained per hour, which is 2.5 percent by weight carbon black based on the carbon content of the heavy fuel oil. The carbon black must be separated from the scrubbing water before the latter can be used to purify additional raw gas or be discarded as sewage.

EXAMPLE 350 liters of a catalyst consisting of pelletized magnesium oxide-chromium oxide with a molar ratio of MgO :$Cr_2O_3$ = 1:1 and in a particle size of 15–20 millimeters are placed in the same reactor used in the control on a grate disposed above the bottom of the reactor. The top level of that packing is spaced 1,200 millimeters below the inlet for the reactants at the top end of the reactor. Fuel oil, steam and oxygen are introduced into the reactor at the rates stated in the Control and reacted under the same conditions. Only traces of carbon black can be analytically detected in the cracked gas discharged at the bottom of the reactor. The scrubbing of the cracked gas with water to cool the gas results in a clear water effluent. The rates at which gases are produced in the two comparison rims and the compositions of said gases do not substantially differ:

| | | |
|---|---|---|
| $H_2S$ + COS | 0.5 | 0.5 |
| $CO_2$ | 4.2 | 4.0 |
| CO | 47.1 | 47.9 |
| $H_2$ | 47.4 | 46.8 |
| $CH_4$ | 0.5 | 0.5 |
| $N_2$ | 0.3 | 0.3 |

Because a formation of carbon black has been entirely avoided, there is no need for a plant for removing carbon black from a mixture of carbon black and water. The reduction of capital requirements and operating costs results in a cost reduction of the gas by about 15 percent.

What is claimed is:

1. Process for gasifying liquid high-boiling hydrocarbons by treatment with water vapor and oxygen which comprises:
    a. reacting such hydrocarbons with water vapor and oxygen at temperatures above 1,200° C. to produce a gaseous reaction product containing carbon black; and
    b. thereafter contacting said gaseous reaction product with a chromium oxide containing catalysts having at least 48 percent by weight chromium oxide thereby reacting said gaseous reaction product with said carbon black to form gaseous substances.

2. Process of claim 1, wherein the catalyst consists of chromic oxide.

3. Process of claim 1, wherein the catalyst comprises chromium oxide on a magnesium oxide support.

4. Process of claim 1 wherein the catalyst contains chromium oxide and magnesium oxide in a molar ratio of 1:4 to 3:1.

5. Process of claim 3 wherein the catalyst contains chromium oxide and magnesium oxide in a molar ratio of 1:1.5 to 1.5:1.

6. Process of claim 1 wherein the catalyst is shaped to form uniform particles which are heat-treated at temperatures above 1,400° C.

7. Process of claim 1 carried out at a pressure of 1 to 100 kilograms per square centimeter.

* * * * *